(No Model.) 2 Sheets—Sheet 1.
P. PANOULIAS.
MACHINE FOR DIPPING CHOCOLATE DROPS.
No. 588,349. Patented Aug. 17, 1897.
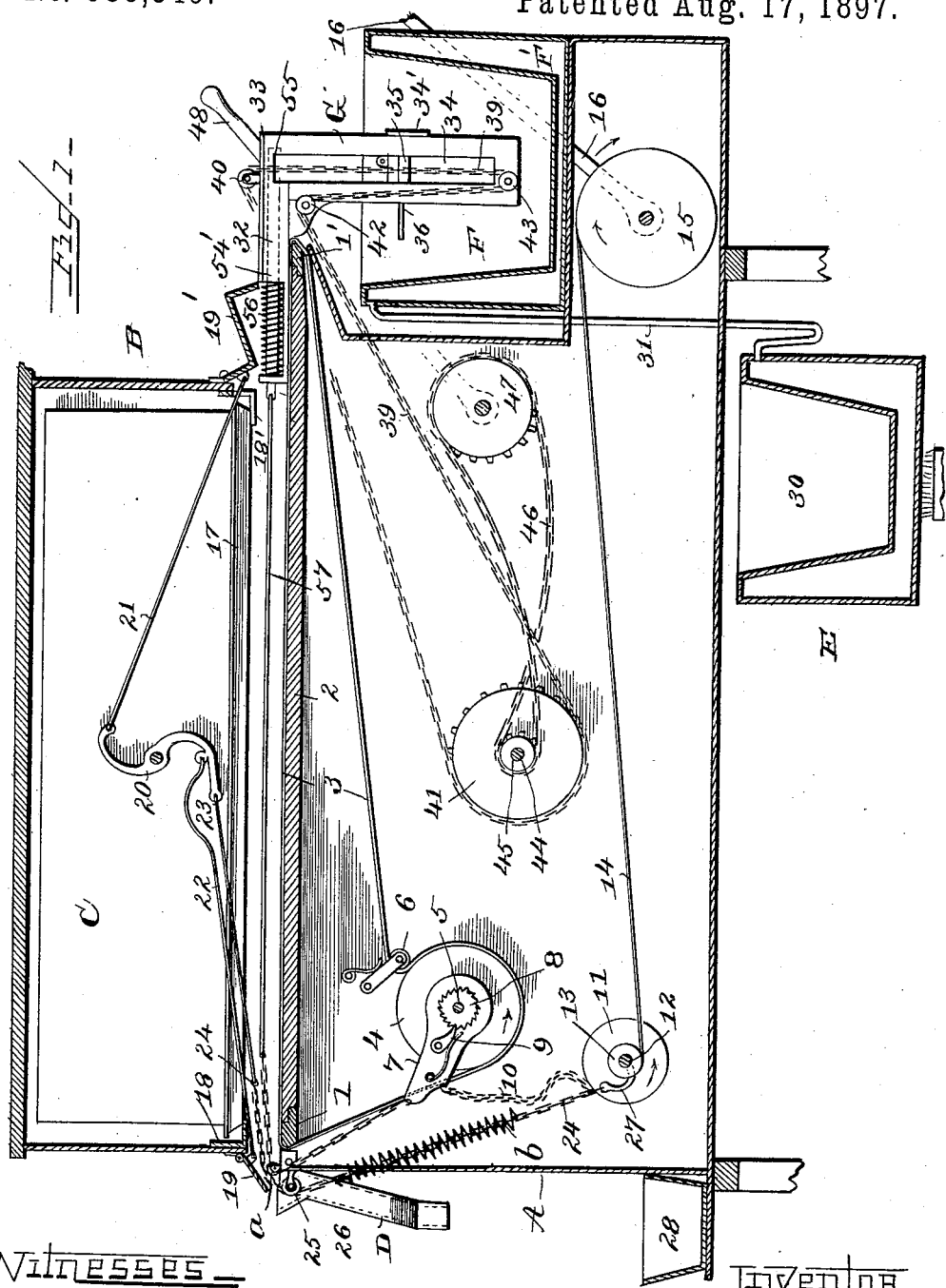
Witnesses
G. A. Vauberschmitt.
J. D. Kingsbury
Inventor
Panagietis Panoulias
By Wm. A. Bates
Attorney

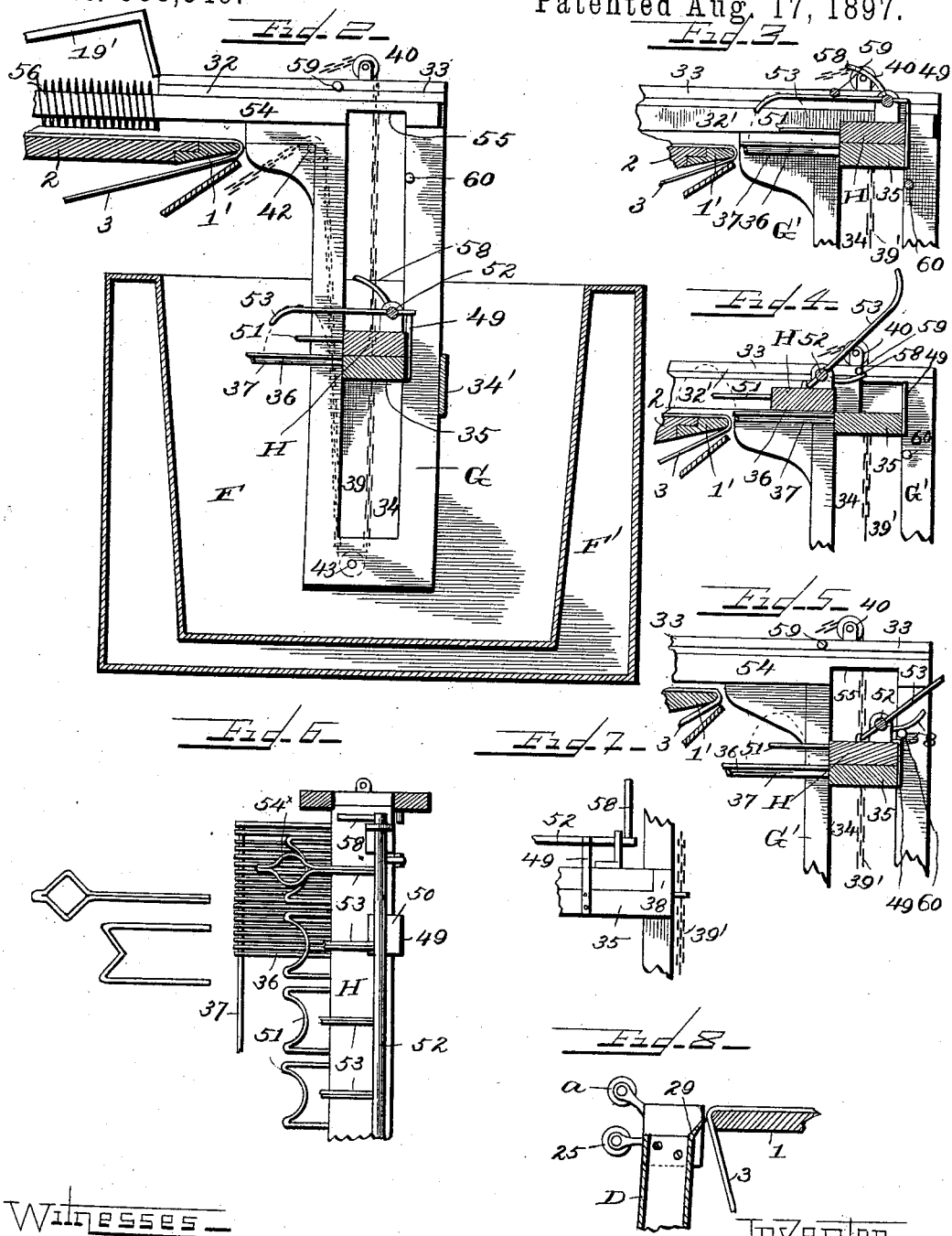

UNITED STATES PATENT OFFICE.

PANAGIOTIS PANOULIAS, OF NEW YORK, N. Y.

MACHINE FOR DIPPING CHOCOLATE DROPS.

SPECIFICATION forming part of Letters Patent No. 588,349, dated August 17, 1897.

Application filed November 18, 1896. Serial No. 612,603. (No model.)

*To all whom it may concern:*

Be it known that I, PANAGIOTIS PANOULIAS, a subject of the King of Greece, residing at New York city, in the county of New York and State of New York, have invented certain new and useful Improvements in Machines for Dipping Chocolate Drops; and I do hereby declare the following to be a full, clear, and exact description of the invention, such as will enable others skilled in the art to which it appertains to make and use the same.

My invention has relation to improvements in confectionery mechanism of that class or style known as "chocolate-dipping" machines; and the object is to provide a simple, efficient, and expeditious mechanism for dipping chocolate drops, as hereinafter will be fully described, and the novelty thereof particularly pointed out in the claims.

I accomplish the objects and purposes of my invention by the mechanism illustrated in the accompanying drawings, forming part of this specification, and wherein—

Figure 1 is a transverse vertical section through the machine and its several compartments. Fig. 2 is a transverse section through the chocolate-pan, showing one of the carrying-frames, the carrying-plate, the shifting board, and section of part of the marble table and chocolate-carrying apron. Fig. 3 is a detail sectional view wherein the chocolate-frames are shown as lifted or raised preliminary to moving the shifting board onto the chocolate-apron, the chocolate drops being shown in dotted lines with one of the retaining-arms holding it in position. Fig. 4 is a detail sectional view showing the shifting board moved from the carrier and the chocolate drop moved onto the apron. Fig. 5 is a detail sectional view showing the carrying-plate and shifting board as again descending into the vessel. Fig. 6 is a plan view of the shifting board and carrying-fingers of the carrying-plate, a part only being shown. Fig. 7 is a detail view showing the arrangement of the carrying-plate and the shifting board, with rock-shaft on the latter. Fig. 8 is a detail section of the discharge-spout, showing the scraper which releases the chocolate drops from the apron.

It will be premised, referring to Fig. 1 of the drawings, that certain of the elements of the operating mechanism therein shown are used in duplicate in the construction, and that these will be mentioned in the description of the mechanism, the constructions being well understood.

Referring to the drawings, A designates a rectangular casing or frame of such size and dimensions as to support and inclose the requisite operating parts. This casing may be supported on suitable benches or other proper means, as indicated in the drawings in Fig. 1. At the top of the casing and lengthwise thereof are secured oppositely-arranged rails or plates 1 1', having their inner edges rabbeted, as shown, to constitute supports for a marble plate or slab 2, covering the top of the casing and forming a table, over which the carrying apron or cloth 3 is arranged. The apron 3 lies flat and in alinement with the upper surface of the table and is carried about a roller 4, journaled across the casing on a shaft 5, and a tightener-roll 6 is suitably interposed to keep the apron stretched in its operation. A waxed paper is arranged on the face of the apron on which the confections rest in their passage over the table. The movement of the apron is intermittent, the steps being of such length as to carry a row of the confections from the carrying-plate onto the table, and the movement is accomplished by the following-described means.

On the shaft 5 at a suitable point is loosely mounted an arm 7, and fixed on the said shaft at the side of the arm 7 is a ratchet-disk 8, which is engaged by a spring-actuated pawl 9, pivotally mounted on the arm, whereby the arm is held in a fixed position to rotate the roller or drum 4 in the direction to move the apron across the table and is left free to be returned to normal position by the action of a spring, as hereinafter specified. To the arm 7 is fastened one end of a chain 10, the other and lower end thereof being properly secured to a sheave or pulley 11, mounted on a shaft 12, arranged across the casing. To the sheave 11 or to another sheave 13 is secured one end of a cord or cable 14, the other end thereof being fastened to a sheave or pulley 15, journaled at the front of the casing, substantially as shown in Fig. 1 of the drawings, and to the sheave 15 is secured a handle or lever 16, so arranged and disposed that the requisite rotation and movement may be imparted to the connected parts.

It will be perceived from the foregoing description that by moving down the handle 16 in the direction of the arrow through the cable 14 the chain 10 will be tightened and draw down the arm 7, and thus rotate the roller 4 a determined distance, which last movement results in moving the apron the required distance to carry a row of confections onto the table. Above the table is suitably supported the ice-box B, space being left between the bottom thereof and the face of the table sufficient to permit the free passage of the confections thereunder. In the ice-box B is the ice-chest C, consisting of a rectangular metal box of any approved construction. The ice-chest rests in a false bottom 17 to retain the drip or sweat from the ice and prevent it from dropping down on the confections on the table as they pass under the box. The false bottom 17 is supported on brackets or flanges 18 18', fastened to the inner lower edges of the ice-box. To the lower side edges of the ice-box are hinged closures or doors 19 19'. The door 19 consists of a straight metal strip hinged to the ice-box, and the door 19' is of the form in cross-section shown in Fig. 1, it being extended or widened to cover a space at some distance forward from the ice-box and rests with its free edge on the frames, substantially as shown. It being essential to open and close these doors in sequence with the entrance and discharge of a line or row of confections, I have devised the following-described means for doing this.

On the ice-chest is fulcrumed a lever 20, to the upper arm of which is fastened one end of a rod 21, the other end thereof being secured to the door 19', and to the lower arm of said lever is fastened one end of a rod 22, the other end thereof being secured to the door 19, and to the end of the lower arm of the lever 20 is fastened one end of a rod 23, the other end being fastened to the upper end of a chain 24, which is led over a sheave 25, journaled in a support 26, mounted at the upper rear part of the casing. The chain 24 extends down from the sheave 25 and has its lower end secured to an arm 27, projecting from the shaft 12, which is operated by the cable 14, sheave 15, and handle 16. It will now be seen that when the handle 16 is drawn downward the lever 20 is moved and the doors first opened and that the chain 10 is gradually tightened to effect the movement of the apron in sequence. The stress on the chain 24 when the lever is released is relieved by means of a spring $b$, having its upper end fastened to a point on the casing and the lower end secured to a link in the chain, so that the relief on the chain will permit the doors to close by gravity and the sheaves 11 and 15 and lever 16 will be returned to normal position for subsequent movements.

At the rear end of the casing is arranged and secured the discharging funnel and spout D, adapted to receive and carry the confections into a suitable receptacle 28, from whence they may be removed and packed as desired. To release any confections which may stick to the wax-paper, a scraper 29 is fixed across the inner upper edge of the funnel, the sharp edge of the scraper alining with the surface of the wax-paper on the apron and cuts and lifts free any of the confections which would otherwise adhere thereto.

E designates the heating-pan or boiler by which heat is imparted to the chocolate-pan, in which the confections are dipped. A removable chocolate-pan 30 may be arranged in the heater E in which a supply of chocolate may be heated and liquefied and then subsequently deposited in the vessel in which the confections are dipped.

F designates the main chocolate pan or kettle into which the confections are dipped. The kettle F is placed in an outer vessel F', a space being left between the two, as shown. A steam-pipe 31 conveys the steam from the heater E to vessel F' and supplies the means for keeping the chocolate in the proper temperature and condition.

At the front of the casing at each end thereof, are secured two rails 32 32', which project outward over the chocolate-pan F and have on their inner upper edges inwardly-extending flanges 33, against which the ends of the shifting board lodge when drawn up to its limit to direct the board in its movement toward the table and to prevent it from being drawn out of the frame. To these rails 32 32', at the outer ends, are secured oppositely-arranged and vertically-depending frames G G', formed or made with vertical ways or guide-slots 34, in which the ends of a lifting-plate 35 engage and are guided in the reciprocating movements of the said plate. Projecting inward and horizontally from the lifting-plate 35 are secured a series of metal fingers 36, the outer ends of which rest on a rectangular frame-bar 37, substantially as shown in the drawings. The dripping chocolate falls through the interstices between the fingers, and any drops adhering to the bottoms of the confections are scraped off when the confections are pushed off the fingers. The lifting-plate 35 is formed with end pieces 38 38 at the ends, between which the shifting board sets, as hereinafter more fully specified.

To raise and lower the lifting-plate 35, the following-described means are provided: The ends of the lifting-plate are secured to oppositely-arranged chains 39 39', as indicated in Fig. 1 of the drawings, and these operating-chains are carried over guide-sheaves 40 on the rails and thence around sprockets 41 to guide-sheaves 42 down to guide-sheaves 43. On the shaft 44 of the sprocket-wheels 41 is mounted a smaller sprocket 45, on which is a chain 46, carried around a sprocket-wheel 47, suitably journaled toward the front of the casing, as shown. A handle or lever-bar 48 is provided to give the chains and their associated elements sufficient reciprocating movements to carry the lifting-plate up and down into and out of the chocolate in the chocolate-pan F.

H designates the shifting board, which is of the same width as the plate 35 and on which it is carried and is of a length to set between the end pieces thereon, as indicated in Fig. 7 of the drawings. To prevent the shifting board H from being moved outward farther than in alinement with the plate 35, vertical springs or bars 49 are secured to the outer edge face of the said plate, the upper ends of the bars 49 being bent down and inward, as at 50, to take over the board and thus hold it from vertical displacement on the plate.

To the inner edge of the board H are secured a series of frames 51, shaped with curved end bars to take about the bodies of the confections to push them off the fingers of the lifting-plate when raised to a plane parallel with the table. On the board H is journaled a rock-shaft 52, from which are projected a series of arms 53, formed with openings $54^\times$, which take over the upper parts of the confections and hold them down on the fingers, as indicated in the drawings. As shown in Fig. 4 of the drawings, the board H, when lifted to the limit of its movement, is movable in the direction of the table and on a plane therewith to push the confections on the table, and this movement is done by means of oppositely-arranged slide-bars 54 54', disposed in suitable ways in the rails 32 32', the slide-bars being formed with recesses 55 in their free ends, which take over the board H, as shown in the drawings, a return-spring 56 being on each slide-bar to return the board back on the lifting-plate. The board H is moved inward by means of a rod 57 and chain 57', arranged over a sheave $a$ and connected at its lower end to the arm 7, the operation of which has already been explained. When the plate and board have been raised to the limit of height, the arms of the rock-shaft are down on the confections, as indicated in Fig. 3, and at this point the arms must be lifted from contact with the confections, which is effected as follows:

On the rock-shaft 52 is secured an inclined or curved arm 58, which when the board H is pulled inward engages a pin 59, fixed in the frame, and the engagement results in lifting the arms, as shown in Fig. 4 of the drawings. When the board H has pushed the confections onto the table and the actuating-lever has been released, the force of the springs on the slide-bars returns the board to its normal position on the plate, the arms remaining elevated or thrown back. Then as the board and plate descend the arm 58 encounters a pin 60 in one of the frames, and the shaft is rocked, carrying the arms down on the confections.

My invention is applicable for dipping any kind of confections which are to be coated with a chocolate covering after being shaped as desired.

All that is necessary to effect the adaptation of the machine to confections of other shapes than conical is to change the shape of the cross-bars of the frames on the shifting board and the openings of the retaining-arms to correspond to the contour of the confections. I have indicated one such change in the illustrations to the left of Fig. 6 of the drawings.

The operation: The operator is stationed at the front of the machine and is supplied with a quantity of the prepared confections to be dipped. These he arranges on the fingers of the lifting-plate and turns down the retaining-bars over them, the plate and board standing during this time at their upper position. The operator then manipulates the lever 48 to lower the plate and board with the confections into the chocolate in the kettle, and then raises them to their upper position. The lever 16 is then moved to pull the shifting board toward the table and move the confections thereon, which being accomplished as heretofore described the shifting board is returned to its normal position on the plate, and the operation of dipping is again proceeded with.

What I claim, and desire to secure by Letters Patent, is—

1. In a chocolate-drop-dipping machine, the combination of suitable frames, a lifting-plate in the frames formed with fingers to carry the confections, a shifting board carried by the lifting-plate, frames in the shifting board to push the confections from the fingers, a rock-shaft having arms to hold the confections on the said fingers, means to raise and lower the said plate and board, and means to shift the board back and forth.

2. In a chocolate-drop-dipping machine, the combination of a chocolate-containing vessel, frames in the vessel formed with vertical ways therein, a lifting-plate arranged in the said ways and provided with a series of fingers to receive and carry confections, a supporting frame-bar under the fingers, means to raise and lower the said plate, a shifting board on the said plate having frames 51 projecting therefrom, means to move the shifting board on a horizontal plane, a rock-shaft journaled on the shifting board, arms in the rock-shaft to hold the confections on the said fingers, and a table to receive the confections from the lifting-plate.

3. In a chocolate-drop-dipping machine, the frames G, G', the lifting-plate 35 having fingers 36 and frame 37; the shifting board H having frames 51, the rock-shaft 52, the arms 53, on the rock-shaft, the table 2, and the endless apron 3, all arranged and combined to operate substantially as described.

In testimony whereof I affix my signature in presence of two witnesses.

PANAGIOTIS PANOULIAS.

Witnesses:
N. CURTIS LAMMOND,
WM. C. MCINTIRE.